Figure 1:
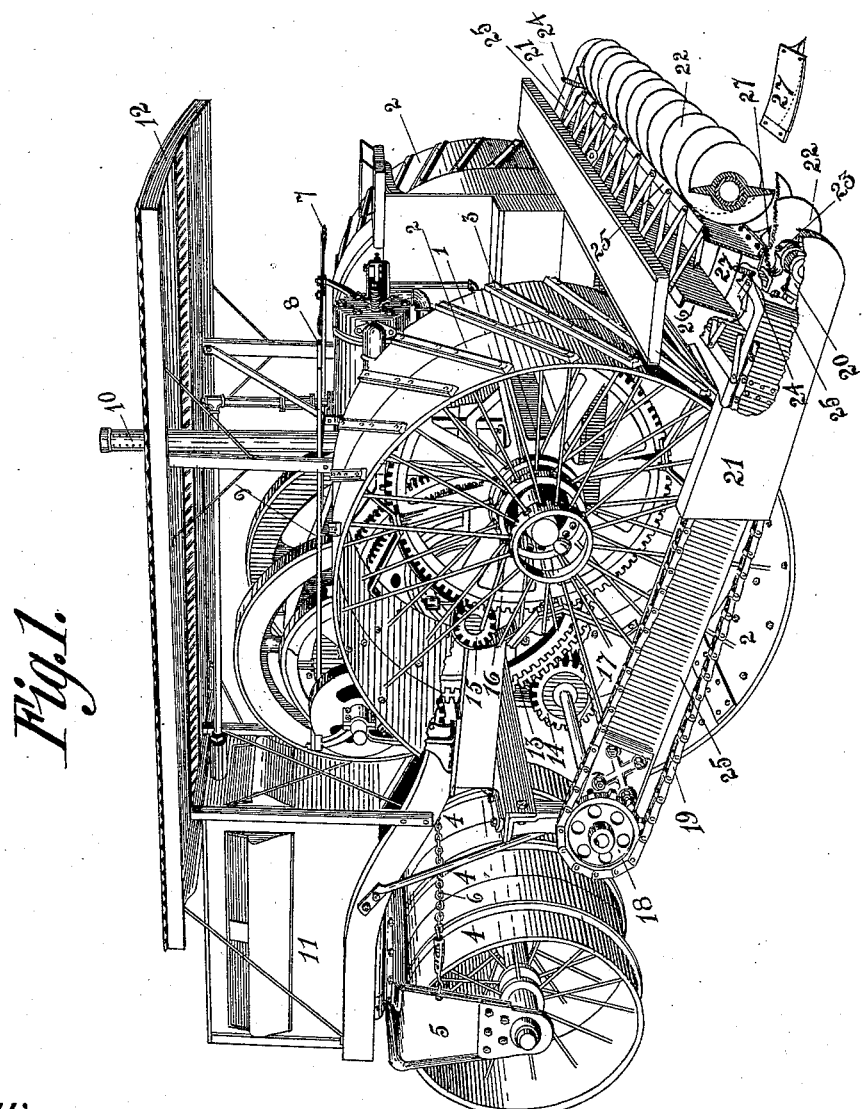

H. M. DERR.
SOIL TILLING MACHINE.
APPLICATION FILED JAN. 24, 1911.

1,045,128.

Patented Nov. 26, 1912.

3 SHEETS—SHEET 1.

Witnesses.
Byron B. Brackett
Robertson Cook

Inventor.
Homer Munro Derr

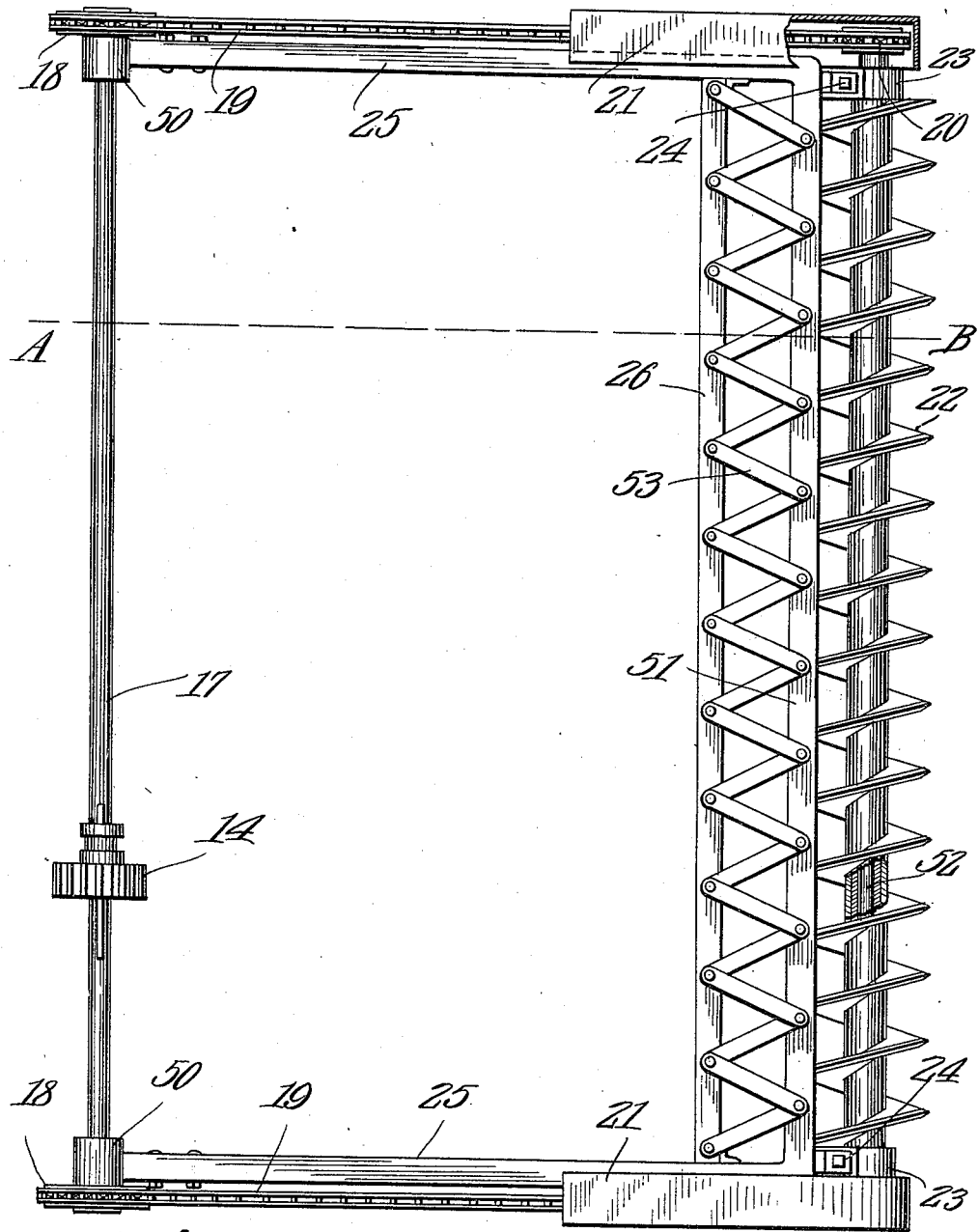

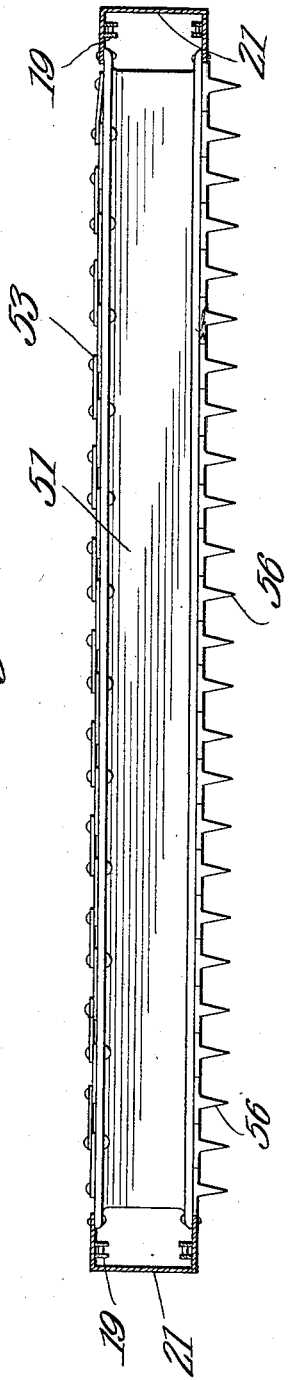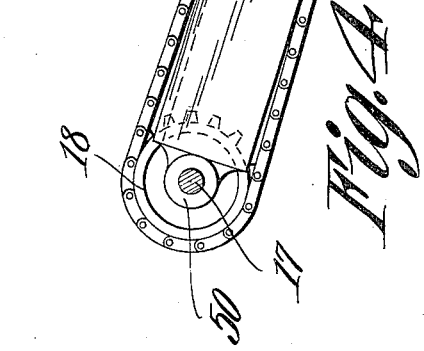

UNITED STATES PATENT OFFICE.

HOMER MUNRO DERR, OF BROOKINGS, SOUTH DAKOTA.

SOIL-TILLING MACHINE.

1,045,128.  Specification of Letters Patent.  Patented Nov. 26, 1912.

Application filed January 24, 1911. Serial No. 604,461.

*To all whom it may concern:*

Be it known that I, HOMER M. DERR, a citizen of the United States, residing at Brookings, in the county of Brookings and State of South Dakota, have invented a new and useful Soil-Tilling Machine, of which the following is a full, adequate, and complete description.

One object of the present invention is to provide a soil tilling mechanism that will thoroughly pulverize the surface of the soil, and leave, upon the top of the soil, a moisture-retaining mulch.

A further object of the invention is to provide a novel form of mechanism adapted to neutralize the side draft caused by the action of a spiral plowing element.

A further object of the invention is to provide a means for neutralizing the side draft caused by a spiral plow, and so to construct said means, that the same will crush, grind and level the previously plowed soil in advance of the plowing mechanism.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows in perspective, a motor vehicle equipped with the plowing mechanism constituting the subject matter of the present invention, parts being broken away; Fig. 2 is a top plan of the plowing mechanism; Fig. 3 is a rear elevation of the plowing mechanism, the spiral plow being removed; Fig. 4 is a section on the line A—B of Fig. 2; and Fig. 5 is a detailed perspective of one of the shoes which constitute a portion of the plowing mechanism.

In Fig. 1 of the drawings, a motor-propelled vehicle is shown, the same being delineated in the form of a traction engine, whereof the drive wheels are denoted by the numeral 1, and the prime mover by the numeral 9. Journaled for rotation in the frame of the traction engine, and disposed transversely of the line of advancement, is a shaft 17, provided with a pinion 14, meshing into a gear train 13 whereby the shaft 17 is operatively connected with the engine 9, the construction, therefore, being such that, when the engine 9 is operated to advance the structure, the shaft 17 will be rotated likewise.

The soil tilling mechanism proper, comprises an arched frame 25, preferably fashioned from a channel member. At its free ends, the arched frame 25 is equipped with bearings 50, receiving the shaft 17, the construction being such that the frame 25 is pivotally supported upon the shaft 17, the intermediate portion 51 of the arched frame 25 extending transversely of the line of draft, to the rear of the wheels 1.

The arched frame 25 carries bearings 23, vertically adjustable by means of screws 24 or the like, the bearings 23 carrying for rotation, a shaft 52, located to the rear of the intermediate portion 51 of the frame 25, the shaft 52 carrying a spiral plow 22. Obviously, through the instrumentality of the elements 24, the bearings 23 may be raised and lowered, thereby adjusting the spiral plow 22 vertically, with respect to the soil.

Fixed upon the ends of the shaft 17, are sprocket wheels 18, the sprocket wheels 20 being carried by the ends of the plow shaft 52. About the sprocket wheels 18 and 20, chains 19 are trained. Fixed to the arched frame 25, adjacent its rear end, are shields 21, covering the sprocket wheels 20, and preventing these sprocket wheels and the chains 19 from becoming clogged with earth, when the frame 25 is drawn along, to exercise its plowing function, in the manner to be described hereinafter.

The sides of the frame 25 are connected by a cross bar 26 which, like the frame 25, is preferably fashioned from a channel member, the cross bar 26 being spaced slightly from the intermediate portion 51 of the arched frame. As denoted by the numeral 53, braces may be employed for uniting the cross bar 26 with the intermediate portion 51 of the arched frame 25.

The invention further includes a plurality of shoes, denoted generally by the numeral 27, one of these shoes appearing in clearest detail, in an inverted position, in Fig. 5. The shoes 27 are equipped with openings 54, adapted to receive bolts or other securing elements, whereby the shoes may be secured to the intermediate portion 51 of the arched frame, and to the cross bar 26. Between their ends, the shoes 27 are curved downwardly, as shown at 55, so as to engage properly with the soil, it being understood that when the plowing mechanism is drawn forwardly, the shoes 27, dragging over the soil, constitute the means whereby the free, rear portion of the arched frame 25 is supported. Each shoe is equipped with a depending blade 56, extended longitudinally of the draft line, the lower edge of the blade 56 being downwardly curved, as shown at 57, and the blade being wedge-shaped in cross section. The rear extremity of the blade 57 protrudes beyond the shoe proper 27, as shown at 58, to extend beneath the spiral plow 22, the upper, rear edge of the blade 56 being concaved, as shown at 59, to conform approximately to the periphery of the spiral plow 22.

Although the device herein disclosed is capable of a wide variety of uses, it is essentially a soil tilling machine and not a plowing machine. With the foregoing end in view, it may be presupposed that in many instances the soil will have been plowed before the structure herein disclosed is employed.

It will be seen that when the arched frame 25 is drawn forwardly over the ground, the rear end of the frame will be supported upon the shoes 27, the shoes 27 riding over the surface of the ground, and constituting a means for supporting the rear end of the frame 25. Owing to the curvature of the shoes, denoted by the numeral 55, the shoes will pass readily over the soil, crushing, grinding and leveling the same. The blades 56, entering the soil, will tend to neutralize the side draft caused by the operation of the spiral plow 22, these blades 56, at the same time, constituting furrow openers, for the spiral plow 22, the plow engaging and spreading the soil which has been compacted and pulverized by the action of the shoes 27.

Special emphasis is laid upon the holding-down action of the series of shoes 27, together with the pressing action of the relatively heavy frame 25 upon which the shoes are mounted. The shoes, in combination with the spiral plow, result in a peculiar operation. I am aware that a spiral plow is not, broadly speaking, a novel element, but, in so far as I am advised as to the state of the art, this invention is novel, in that there is provided, just preceding, and relatively near to the cutting edge of the spiral, a means for holding down the preceding soil securely, while a comparatively thin, crescent-shaped slice is being cut off and turned over. In the absence of some means, in advance of the spiral plow, for holding down the soil, sods and large clods of earth are engaged by the spiral plow and merely turned over or tumbled about, leaving the surface of the soil rough and broken; while, in the present invention, the earth is held down securely in advance of the spiral plow, whereby clods, sods and the like, will be sliced and severed by the action of the plow.

It will be seen that the operation of the shoes 27, coöperating with the spiral plow 22, will be to compact the soil, for subsequent manipulation by the plow, to prevent a side draft, and to leave upon the surface of the soil, a moisture-retaining mulch.

Through the instrumentality of the gear train 13 and the pinion 14, rotation will be imparted to the shaft 17, rotation being imparted to the plow shaft 52 and to the plow 22, through the medium of the sprocket wheels 18 and 20, and the drive chains 19.

Having thus described the invention, what is claimed is:

1. A device of the class described comprising a supporting structure; a frame pivoted thereto; a spiral plow journaled for rotation in the frame, transversely of the draft line; and earth-engaging shoes carried by the frame, in advance of the plow.

2. A device of the class described comprising a supporting structure; a frame pivoted thereto; a spiral plow journaled for rotation in the frame, transversely of the draft line; and earth-engaging shoes mounted upon the frame in advance of the plow, the shoes being equipped with depending blades.

3. A device of the class described comprising a supporting structure; a frame pivoted thereto; a spiral plow journaled for rotation in the frame, transversely of the draft line; earth-engaging shoes secured to the frame in advance of the plow, the shoes being provided with depending blades, having curved lower edges, the blades being rearwardly extended beneath the plow.

4. A device of the class described comprising a supporting structure; a shaft journaled for rotation therein; a frame pivotally supported upon the shaft; a plow shaft journaled for rotation in the frame; a spiral plow upon the plow shaft; means for operatively connecting the shafts; shoes secured to the frame in advance of the plow, the shoes having depending, earth-engaging blades.

5. A device of the class described comprising a supporting structure; a shaft journaled for rotation therein; an arched frame having its free ends pivoted upon the shaft; a plow shaft journaled for rotation upon the frame; a plow upon the plow shaft; means for operatively connecting the shafts; a cross bar connecting opposite points upon the frame; shoes secured to the cross bar and to the intermediate portion of the frame, in advance of the plow, the shoes being downwardly curved, for engagement with the soil, when the device is advanced.

6. A device of the class described comprising a supporting structure; a frame pivoted thereto; a shoe secured to the frame, and provided with a depending, earth-engaging blade; and a spiral plow journaled for rotation in the frame, to the rear of the shoe.

7. A device of the class described comprising a supporting structure; a frame pivoted thereto; a shoe carried by the frame, and downwardly curved, for engagement with the soil, the shoe having a depending, earth-engaging blade, extended in the direction of the draft line, the lower edge of the blade being curved, and the rear extremity of the blade being extended beyond the shoe; and a plow journaled for rotation in the frame, above the rearwardly extended end of the shoe.

8. A device of the class described comprising a supporting structure; a frame pivoted thereto; a spiral plow journaled for rotation in the frame, transversely of the draft line; and a fixed earth-engaging means upon the frame in advance of the plow and extending therebeneath, for holding and pulverizing clods while the same are being cut by the plow.

9. A device of the class described comprising a supporting structure; a frame pivoted thereto; fixed means upon the free end of the frame for holding down the soil; and rotary means upon the frame to the rear of the fixed means for cutting a slice from the soil while the same is held by the fixed means.

HOMER MUNRO DERR.

Witnesses:
B. B. BRACKETT,
ROBERTSON COOK.

Copies of this patent may be obtained for five cents each, by addressing the "Commissioner of Patents, Washington, D. C."